(12) United States Patent
Jung et al.

(10) Patent No.: US 8,531,113 B2
(45) Date of Patent: Sep. 10, 2013

(54) DRIVING APPARATUS AND DRIVING METHOD OF LED DEVICE

(75) Inventors: Ilyong Jung, Bucheon (KR); Chan Son, Seoul (KR); Moonho Choi, Bucheon (KR); Seunguk Yang, Anyang (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 263 days.

(21) Appl. No.: 13/106,708

(22) Filed: May 12, 2011

(65) Prior Publication Data

US 2012/0126703 A1 May 24, 2012

(30) Foreign Application Priority Data

Nov. 23, 2010 (KR) .................. 10-2010-0117009

(51) Int. Cl.
*H05B 37/02* (2006.01)
(52) U.S. Cl.
USPC ........................................................ 315/122
(58) Field of Classification Search
None
See application file for complete search history.

(56) References Cited

U.S. PATENT DOCUMENTS

| | | | |
|---|---|---|---|
| 2005/0196111 A1* | 9/2005 | Burdick et al. | 385/92 |
| 2008/0106833 A1* | 5/2008 | Lewinski et al. | 361/49 |
| 2010/0013395 A1* | 1/2010 | Archibald et al. | 315/185 R |

OTHER PUBLICATIONS

AS3693C-9 Channel high precision LED driver for LCD Backlight, Apr. 24, 2009, pp. 1-33, Revision 1.2, austriamicrosystems.

* cited by examiner

*Primary Examiner* — Crystal L Hammond
(74) *Attorney, Agent, or Firm* — Okamoto & Benedicto LLP

(57) ABSTRACT

A driving apparatus of an LED device is provided. The LED device includes a plurality of LED channels, and each LED channel includes a plurality of LEDs connected in series. A power converter has an output terminal connected to a first terminal of each LED channel, and converts an input voltage into an output voltage to output the output voltage to the output terminal. A plurality of current controllers correspond to the plurality of LED channels, respectively. Each current controller is connected to a second terminal of a corresponding LED channel, and controls a current of the corresponding LED channel. The voltage sensor outputs a sensed voltage corresponding to the output voltage of the output terminal. The fault controller determines whether to stop operation of the power converter by comparing the sensed voltage with a reference voltage.

19 Claims, 5 Drawing Sheets

DRIVING APPARATUS AND DRIVING METHOD OF LED DEVICE

CROSS-REFERENCE TO RELATED APPLICATION

This application claims priority to and the benefit of Korean Patent Application No. 10-2010-0117009 filed in the Korean Intellectual Property Office on Nov. 23, 2010, the entire contents of which are incorporated herein by reference.

BACKGROUND (a) Field

Embodiments relate to a driving apparatus and a driving method of a light emitting diode (LED) device.

(b) Description of the Related Art

An LED device supplies a current to LEDs to drive them, and the LEDs emit light having brightness corresponding to the current. The LED device may be used as a light source of a non-emissive type of display device such as a liquid crystal display (LCD) or for lighting. The LED device includes a plurality of LED channels that are connected in parallel to emit light having predetermined brightness. Each LED channel includes a plurality of LEDs connected in series. Further, the LED device includes a power converter for supplying the currents to the plurality of LED channels.

If any one of the plurality of LED channels is short-circuited, the power converter is overloaded. As a result, the power converter may be destroyed. Therefore, the LED device includes a protection circuit for protecting the power converter.

One example of the protection circuit is a circuit for sensing a voltage at end terminal of each LED channel to stop operation of the power converter when the voltage at the end terminal becomes 0V. However, even when a connection between two LEDs of the LED channel is open-circuited, the end terminal voltage of the LED channel becomes 0V. In this case, if the other LED channels are normally operated, the LED devices can supply the light having the predetermined brightness. Accordingly, it is not required for the operation of the LED device to be stopped. However, the existing protection circuit stops the operation of the power converter when the connection of the LEDs is open-circuited.

The above information disclosed in this Background section is only for enhancement of understanding of the background of the invention and therefore it may contain information that does not form the prior art that is already known in this country to a person of ordinary skill in the art.

SUMMARY

Aspects of the present invention provide a driving apparatus and a driving method of an LED device for stopping operation of a power converter when an LED channel is short-circuited.

According to an aspect of the present invention, a driving apparatus of a light emitting diode (LED) device is provided. The LED device includes a plurality of LED channels, and each LED channel includes a plurality of LEDs connected in series. The apparatus includes a power converter, a plurality of current controllers, a voltage sensor, and a fault controller. The power converter has an output terminal connected to a first terminal of each LED channel, and converts an input voltage into an output voltage to output the output voltage to the output terminal. The plurality of current controllers correspond to the plurality of LED channels, respectively. Each current controller is connected to a second terminal of a corresponding LED channel, and controls a current of the corresponding LED channel. The voltage sensor outputs a sensed voltage corresponding to the output voltage of the output terminal. The fault controller determines whether to stop operation of the power converter by comparing the sensed voltage with a reference voltage.

The voltage sensor may include a plurality of resistors connected in series between the output terminal and a ground terminal, and may sense a fraction of the output voltage by voltage division of the resistors as the sensed voltage.

The fault controller may compare the sensed voltage with the reference voltage while the current controllers float the second terminals of the LED channels.

The fault controller may stop operation of the power converter when the sensed voltage is lower than the reference voltage at a time when a predetermined period passes after the operation of the power converter begins.

The predetermined period may be longer than a period needed to increase the output voltage to a desired voltage while the output terminal is floated.

The fault controller may include a timer configured to check the predetermined period.

The timer may output a signal having a predetermined level after the predetermined period. The fault controller may further include a first comparator configured to compare the sensed voltage with the reference voltage, an SR latch configured to receive an output of the first comparator at a set terminal, and a logic gate configured to perform a logic operation on an output of the SR latch and an output of the timer to control the operation of the power converter.

The SR latch may receive a reset pulse at a reset terminal. The logic gate may include an AND gate configured to perform an AND operation on an output of an inverted output terminal of the SR latch and the output of the timer. The predetermined level may be a high level.

The timer may include a current source configured to supply a current, a capacitor configured to be charged by the current of the current source, and a second comparator configured to compare a voltage of the capacitor with a timer voltage to generate the output of the timer.

The timer voltage may be equal to a voltage that is charged to the capacitor by the current of the current source during the predetermined period.

The power converter may include a power converting module configured to convert the input voltage into the output voltage, and a first switch configured to transfer the input voltage to the power converting module. The fault controller may turn off the first switch to stop the operation of the power converter.

The first switch may have a first terminal connected to the input voltage, and a second terminal The power converting module may include an inductor, a second switch, a diode, and a capacitor. The inductor may have a first terminal connected to the second terminal of the first switch and a second terminal. The second switch may have a first terminal connected to the second terminal of the inductor and a second terminal connected to a ground terminal, and may be alternately turned on and off. The diode may have an anode connected to the second terminal of the inductor and a cathode. The capacitor may be connected between the cathode of the diode and the ground terminal. A voltage of the capacitor may be the output voltage.

The apparatus may further include a driving controller configured to control the output voltage of the power converter based on a voltage at the second terminals of the LED channels.

According to another aspect of the present invention, a driving method of an LED device is provided. The LED device includes including a plurality of LED channels, and each LED channel includes a plurality of LEDs connected in series. The method includes converting an input voltage into an output voltage at a first time, transferring the output voltage to the LED channels through an output terminal, comparing a sensed voltage corresponding to the output voltage with a reference voltage, and stopping operation for converting the input voltage into the output voltage when the sensed voltage is lower than the reference voltage at a second time when a predetermined period passes from the first time.

The method may further include dividing the output voltage by a plurality of resistors to generate the sensed voltage.

Transferring the output voltage may include floating first terminals of the LED channels while transferring the output voltage to second terminals of the LED channels.

The predetermined period may be longer than a period needed to increase the output voltage to a desired voltage while the output terminal is floated.

Comparing the sensed voltage with the reference voltage may include outputting a first signal whose level is changed in accordance with a comparison result between the sensed voltage and the reference voltage. Stopping the operation may include changing a level of a second signal in accordance with the change of the level of the first signal, outputting a third signal whose level is changed at the second time, and stopping the operation when a signal that is generated by performing a logic operation on the level of the second signal and the level of the third signal has a predetermined level.

Outputting the third signal may include charging a predetermined current to a capacitor, and changing the level of the third signal when a voltage charged to the capacitor is not lower than a timer voltage. The timer voltage may be equal to a voltage that is charged to the capacitor by the predetermined current during the predetermined period.

DETAILED DESCRIPTION

Figure 1:
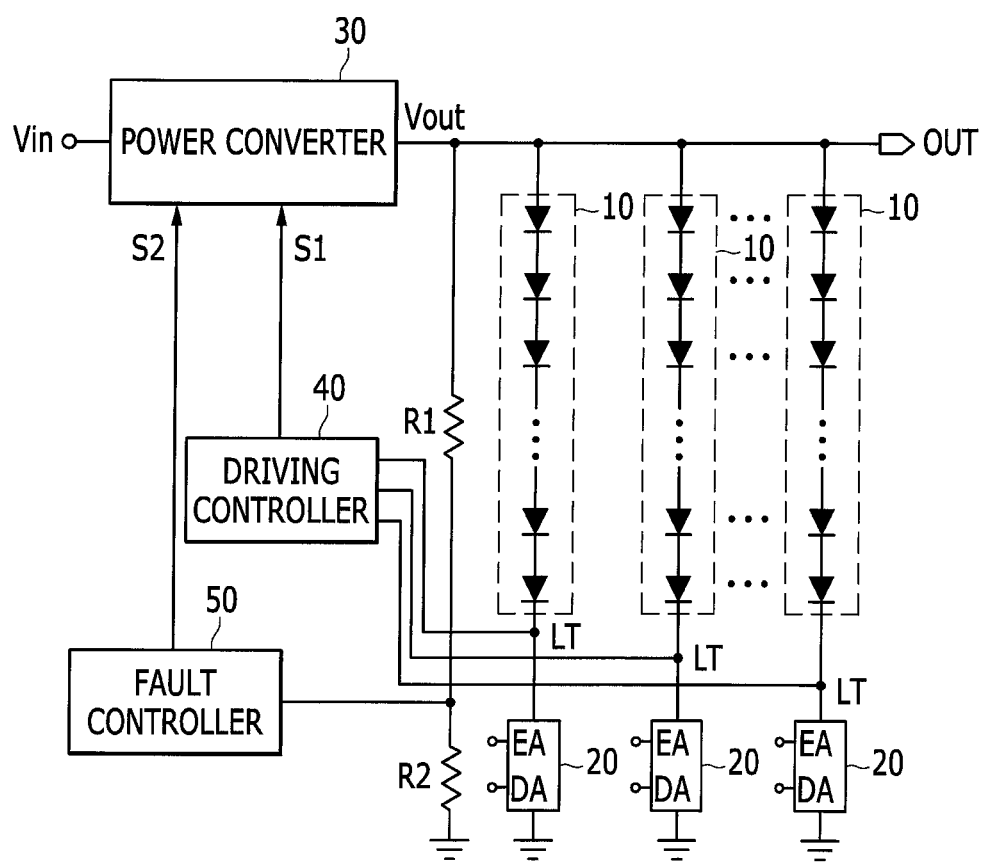
FIG. 1 is a schematic diagram of an LED device according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "connected" to another element, the element may be "directly connected" to the other element or "electrically connected" to the other element through a third element.

Figure 2:
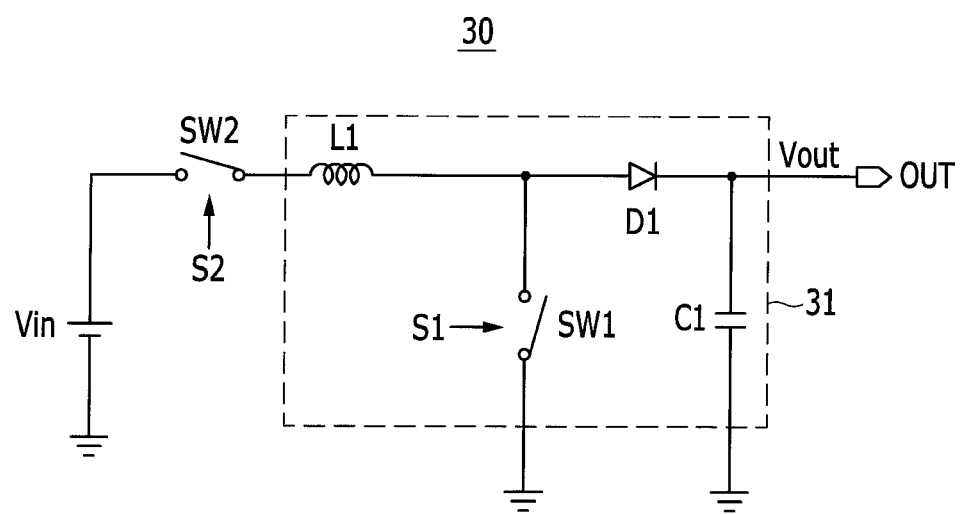
FIG. 2 is a schematic diagram of one example of a power converter shown in FIG. 1.

FIG. 1 is a schematic diagram of an LED device according to an embodiment of the present invention, and FIG. 2 is a schematic diagram of one example of a power converter shown in FIG. 1.

Referring to FIG. 1, an LED device includes a plurality of LED channels 10 and an LED driver. The LED driver includes a plurality of current controllers 20, a power converter 30, a driving controller 40, a fault controller 50, and resistors R1 and R2.

The LED channels 10 are connected in parallel between an output terminal OUT of the power converter 30 and the current controllers 20. Each LED channel 10 includes a plurality of LEDs that are connected in series. The LED channels 10 are operated as loads of the LED device.

Each current controller 20 is connected between a corresponding LED channel 10 and a ground terminal, and has an enable terminal EA and a disable terminal DA. The current controller 20 controls a current flowing in the corresponding LED channel 10 in response to a dimming signal input to the enable terminal EA. The dimming signal may be a pulse width modulation (PWM) signal having a predetermined duty ratio. The current controller 20 allows a current having a certain magnitude to flow in the corresponding LED channel 10 during the duty of the dimming signal so as to control the brightness of the LED channel 10. The current controller 20 controls the current to not flow in the corresponding LED channel 10 in response to a disable signal applied to the disable terminal DA. That is, the current controller 20 disconnects a connection between an end terminal LT of the LED channel 10 and the ground terminal to float the end terminal LT of the LED channel 10. Accordingly, the LED channel 10 is disabled.

The power converter 30 converts an input voltage Vin into an output voltage Vout that is appropriate to drive the LED channel 10, and outputs the output voltage Vout to an output terminal OUT.

The driving controller 40 determines whether to adjust the output voltage Vout of the power converter 30 based on voltages applied to the end terminals LT of the LED channels 10, and outputs a control signal S1 according to the determination to the power converter 30. The power converter 30 adjusts the output voltage Vout based on the control signal S1.

The resistors R1 and R2 are connected in series between the output terminal OUT of the power converter 30 and the ground terminal, and sense the output voltage Vout of the power converter 30 to output a sensed voltage Vsen corresponding to the output voltage Vout. The sensed voltage Vsen is a fraction of the output voltage Vout that is generated by dividing the output voltage Vout using the resistors R1 and R2. That is, the resistors R1 and R2 operate as a voltage sensor for sensing the output voltage OUT.

The fault controller 50 determines whether to stop the operation of the power converter 30 based on the sensed voltage Vsen, and outputs a control signal S2 according to the determination to the power converter 30. The fault controller 50 may stop the operation of the power converter 30 if the sensed voltage Vsen does not exceed a reference voltage while the current controller 20 disables the LED channel 10.

Referring to FIG. 2, one example of the power converter 30 includes a boost converter of a direct current to direct current (DC-DC) converter. In detail, the power converter 30 includes a switch SW2 and a power converting module 31 for converting an input voltage Vin into an output voltage Vout. The power converting module 31 includes a switch SW1, an inductor L1, a diode D1, and a capacitor C1.

The switch SW2 has one terminal connected to the input voltage Vin and the other terminal connected to one terminal of the inductor L1. The other terminal of the inductor L1 is connected to an anode of the diode D1 and one terminal of the switch SW1. A cathode of the diode D1 is connected to one terminal of the capacitor C1, and the other terminal of the capacitor C1 and the other terminal of the switch SW1 are connected to the ground terminal. A voltage of the capacitor C1 is the output voltage Vout.

When the power converter 30 operates, the switch SW1 is alternately turned on and off while the switch SW2 is turned on. When the switch SW1 is turned on, a current flows from the input voltage Vin to the ground terminal via the switch SW2, the inductor L1, and the switch SW1 such that a current flowing in the inductor L1 increases. Subsequently, when the switch SW1 is turned off, the current flowing in the inductor L1 charges the capacitor C1 such that the input voltage Vin is converted into the output voltage Vout. The output voltage Vout is determined by a duty ratio of the switch SW1.

The driving controller 40 controls the duty ratio of the PWM signal S1 applied to the switch SW1 based on a voltage at end terminals of LED channels 10, thereby controlling the output voltage Vout of the power converter 30.

The fault controller 50 turns off the switch SW2 based on the control signal S2, thereby stopping the operation of the power converter 30. That is, the fault controller 50 turns off the switch SW2 for connecting the power converting module 31 and the input voltage Vin so as to block the input voltage Vin from being supplied to the power converter 30. As a result, the fault controller 50 can stop the operation of the power converter 30.

Hereinafter, a protecting operation of an LED device will be described with reference to FIG. 3 and FIG. 4.

Figure 3:
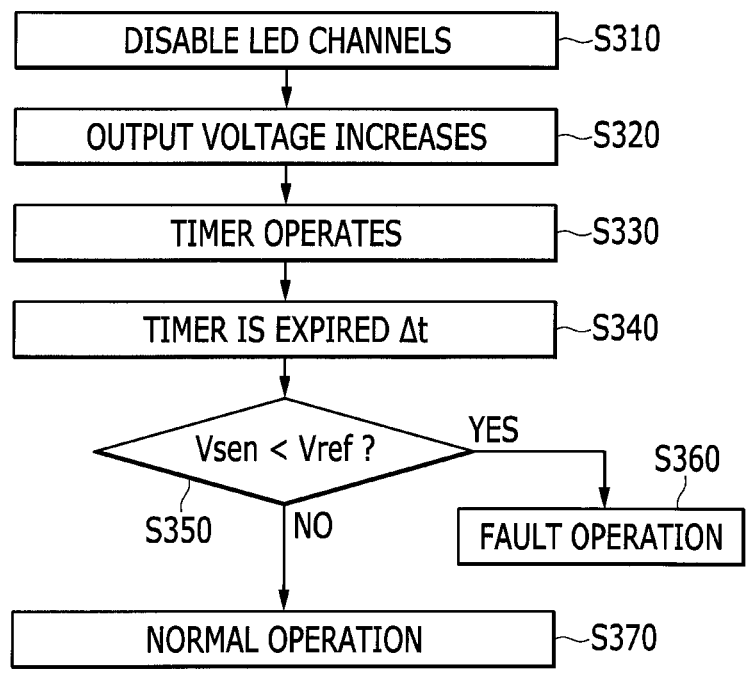
FIG. 3 is a schematic flowchart of a driving method of an LED device according to an embodiment of the present invention.
Figure 4:
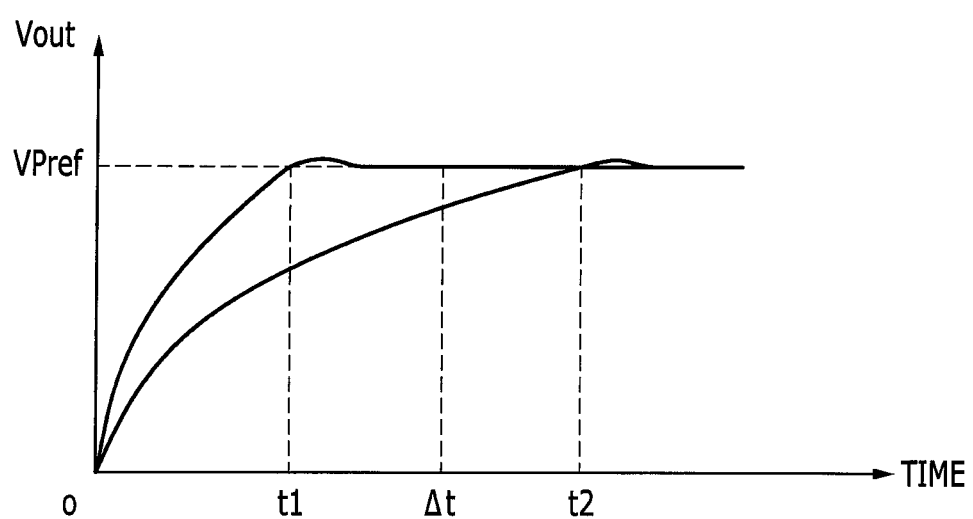
FIG. 4 is a drawing showing output voltages of a power converter at a normal state and a short circuit state.

FIG. 3 is a schematic flowchart of a driving method of an LED device according to an embodiment of the present invention, and FIG. 4 is a drawing showing output voltages of a power converter at a normal state and a short circuit state.

Referring to FIG. 3, a current controller 20 disables LED channels 10 (S310). Next, an output voltage Vout increases by operation of a power converter 30 (S320). Since the LED channels 10 are disabled, the output voltage Vout reaches a desired voltage VPref at a certain time t1 as shown in FIG. 4 if there is no short circuit in the LED channels 10. However, if the short circuit occurs in at least one of the plurality of LED channels 10, LEDs, which are connected between the output terminal OUT of the power converter 30 and a point where the short circuit occurs, operate as loads. Accordingly, the output voltage Vout reaches the desired voltage at a time t2 that is later than the time t1.

A timer (not shown) of the fault controller 50 operates on the operation of the power converter 30 (S330). If the timer is expired after a predetermined period, i.e., after a timer expiration time Δt passes from an operation time 0 of the power converter 30 (S340), the fault controller 50 compares a sensed voltage Vsen corresponding to the output voltage Vout with a reference voltage Vref (S350). The sensed voltage Vsen is lower than the reference voltage Vref when the output voltage slowly increases by the short circuit of the LED channels 10. In this case, the fault controller 50 stops the operation of the power converter 30 to perform fault operation (S360). The sensed voltage Vsen is not lower than the reference voltage Vref when the output voltage Vout normally increases. In this case, the fault controller 50 does not stop the operation of the power converter 30. Accordingly, the current controller 20 enables the LED channels 10, and the LED devices perform normal operation (S370).

The timer expiration time Δt is set to be longer than a period 0-t1 needed to increase the output voltage Vout to the desired voltage VPref while there is no short circuit in the LED channels 10, i.e., the output terminal OUT of the power converter 30 is floated. In addition, the timer expiration time Δt may be set to be shorter than a period needed to increase the output voltage Vout to the desired voltage VPref while the short circuit occurs in the LED that is nearest to the output terminal OUT among the LED channels 10.

Meanwhile, if an open circuit occurs in any LED channel 10, the LED channel 10 is floated such that the power converter 30 does not recognize the LED channel 10 as a load. Therefore, the output voltage Vout reaches the desired voltage VPref at the time t1 although the open circuit occurs in the LED channels 10. As a result, the LED device can normally operate.

As described above, according to an embodiment of the present invention, the LED device can normally operate when the open circuit occurs in the LED channels 10, and the operation of the LED device can be stopped when the short circuit occurs in the LED channels 10.

Next, one example of a fault controller 50 according to an embodiment of the present invention will be described with reference to FIG. 5.

Figure 5:
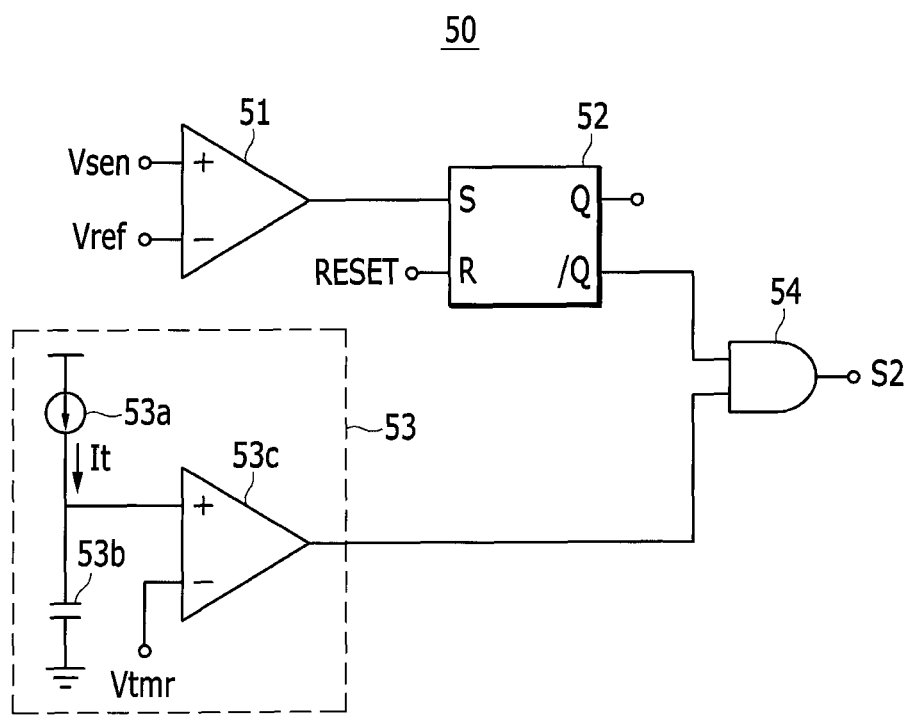
FIG. 5 is a drawing showing one example of a fault controller 50 according to an embodiment of the present invention.

FIG. 5 is a drawing showing one example of a fault controller 50 according to an embodiment of the present invention.

Referring to FIG. 5, one example of a fault controller 50 includes a comparator 51, an SR latch 52, a timer 53, and an AND gate 54.

The comparator 51 compares a sensed voltage Vsen with a reference voltage Vref. The comparator 51 outputs a signal having a low level when the sensed voltage Vsen is lower than the reference voltage, and outputs a signal having a high level when the sensed voltage Vsen is not lower than the reference voltage Vref.

The SR latch 52 receives an output of the comparator 51 at a set terminal S and receives a reset signal at a reset terminal R. The reset signal has the high level as a pulse form at initial operation such that the SR latch 52 outputs a signal having the high level to an inverted output terminal /Q. Subsequently, the reset signal has the low level. Accordingly, when the sensed voltage Vsen is lower than the reference voltage Vref, the SR latch 52 maintains the inverted output terminal /Q at the high level in accordance with the low level signal applied to the set terminal S. When the sensed voltage Vsen is not lower than the reference voltage Vref, the SR latch 52 outputs the low level signal to the inverted output terminal /Q in response to the high level signal applied to the set terminal S.

The timer 53 outputs a low level signal before a timer expiration time Δt, and outputs a high level signal after the timer expiration time Δt. One example of the timer 53 includes a current source 53a, a capacitor 53b, and a comparator 53c. The current source 53a supplies a predetermined current (It) to the capacitor 53b such that a voltage of the capacitor 53b linearly increases. The comparator 53c compares the voltage of the capacitor 53b with a timer voltage Vtmr. The timer voltage Vtmr corresponds to a voltage that is charged to the capacitor 53b by the current (It) during the timer expiration time Δt. Since the voltage of the capacitor 53b is lower than the timer voltage Vtmr before the timer expiration time Δt, the comparator 53c outputs a low level signal. Since the voltage of the capacitor 53b is not lower than the timer voltage Vtmr after the timer expiration time Δt, the comparator 53c outputs a high level signal.

The AND gate 54 performs an AND operation on an output of an inverted output terminal /Q of the SR latch 52 and an output of the comparator 53c. If the sensed voltage Vsen is not lower than the reference voltage Vref, the output of the inverted output terminal /Q of the SR latch 52 has the low level regardless of the timer expiration time Δt such that the AND gate 54 always outputs the low level signal. If the sensed voltage Vsen is lower than the reference voltage Vref at the timer expiration time Δt, the output of the inverted output terminal /Q of the SR latch 52 and the output of the comparator 53c have the high level such that the AND gate 54 outputs the high level signal.

As such, if the sensed voltage Vsen is lower than the reference voltage Vref after the timer expiration time Δt, the fault controller 50 can output the high level signal to stop the operation of the power converter 30. In this case, the switch SW2 of the power converter 30 may be configured as a p-channel transistor. Alternatively, when the switch SW2 is configured as an n-channel transistor, an inverter (not shown) for inverting the high level signal to apply the low level signal to the switch SW2 may be formed in the fault controller 50 or the power converter 30.

As described above, according to an embodiment of the present invention, the short circuit and the open circuit can be distinguished, and a protecting operation can be performed when the short circuit occurs in the LED channels.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A driving apparatus of a light emitting diode (LED) device including a plurality of LED channels, each LED channel including a plurality of LEDs connected in series, the apparatus comprising:
    a power converter having an output terminal connected to a first terminal of each LED channel, and configured to convert an input voltage into an output voltage to output the output voltage to the output terminal;
    a plurality of current controllers corresponding to the plurality of LED channels, respectively, each current controller connected to a second terminal of a corresponding LED channel, and configured to control a current of the corresponding LED channel;
    a voltage sensor configured to output a sensed voltage corresponding to the output voltage of the output terminal; and
    a fault controller configured to determine whether to stop operation of the power converter by comparing the sensed voltage with a reference voltage.

2. The apparatus of claim 1, wherein the voltage sensor includes a plurality of resistors connected in series between the output terminal and a ground terminal, and senses a fraction of the output voltage by voltage division of the resistors as the sensed voltage.

3. The apparatus of claim 1, wherein the fault controller compares the sensed voltage with the reference voltage while the current controllers float the second terminals of the LED channels.

4. The apparatus of claim 3, wherein the fault controller stops operation of the power converter when the sensed voltage is lower than the reference voltage at a time when a predetermined period passes after the operation of the power converter begins.

5. The apparatus of claim 4, wherein the predetermined period is longer than a period needed to increase the output voltage to a desired voltage while the output terminal is floated.

6. The apparatus of claim 4, wherein the fault controller includes a timer configured to check the predetermined period.

7. The apparatus of claim 6, wherein the timer outputs a signal having a predetermined level after the predetermined period, and
    wherein the fault controller further includes:
    a first comparator configured to compare the sensed voltage with the reference voltage;
    an SR latch configured to receive an output of the first comparator at a set terminal; and
    a logic gate configured to perform a logic operation on an output of the SR latch and an output of the timer to control the operation of the power converter.

8. The apparatus of claim 7, wherein the SR latch receives a reset pulse at a reset terminal,
    the logic gate includes an AND gate configured to perform an AND operation on an output of an inverted output terminal of the SR latch and the output of the timer, and
    the predetermined level is a high level.

9. The apparatus of claim 7, wherein the timer includes:
    a current source configured to supply a current;
    a capacitor configured to be charged by the current of the current source; and
    a second comparator configured to compare a voltage of the capacitor with a timer voltage to generate the output of the timer.

10. The apparatus of claim 9, wherein the timer voltage is equal to a voltage that is charged to the capacitor by the current of the current source during the predetermined period.

11. The apparatus of claim 1, wherein the power converter includes:
    a power converting module configured to convert the input voltage into the output voltage; and
    a first switch configured to transfer the input voltage to the power converting module, and
    wherein the fault controller turns off the first switch to stop the operation of the power converter.

12. The apparatus of claim 11, wherein the first switch has a first terminal connected to the input voltage, and a second terminal, and
    wherein the power converting module includes:
    an inductor having a first terminal connected to the second terminal of the first switch, and a second terminal;
    a second switch having a first terminal connected to the second terminal of the inductor and a second terminal connected to a ground terminal, and configured to be alternately turned on and off;
    a diode having an anode connected to the second terminal of the inductor, and a cathode; and
    a capacitor connected between the cathode of the diode and the ground terminal,
    wherein a voltage of the capacitor is the output voltage.

13. The apparatus of claim 1, further comprising a driving controller configured to control the output voltage of the power converter based on a voltage at the second terminals of the LED channels.

14. A driving method of an LED device including a plurality of LED channels, each LED channel including a plurality of LEDs connected in series, the method comprising:

converting an input voltage into an output voltage at a first time;

transferring the output voltage to the LED channels through an output terminal;

comparing a sensed voltage corresponding to the output voltage with a reference voltage; and stopping operation for converting the input voltage into the output voltage when the sensed voltage is lower than the reference voltage at a second time when a predetermined period passes from the first time.

15. The method of claim 14, further comprising dividing the output voltage by a plurality of resistors to generate the sensed voltage.

16. The method of claim 14, wherein transferring the output voltage includes floating first terminals of the LED channels while transferring the output voltage to second terminals of the LED channels.

17. The method of claim 16, wherein the predetermined period is longer than a period needed to increase the output voltage to a desired voltage while the output terminal is floated.

18. The method of claim 16, wherein comparing the sensed voltage with the reference voltage includes outputting a first signal whose level is changed in accordance with a comparison result between the sensed voltage and the reference voltage, and stopping the operation includes:

changing a level of a second signal in accordance with the change of the level of the first signal;

outputting a third signal whose level is changed at the second time; and stopping the operation when a signal that is generated by performing a logic operation on the level of the second signal and the level of the third signal has a predetermined level.

19. The method of claim 18, wherein outputting the third signal includes:

charging a predetermined current to a capacitor; and changing the level of the third signal when a voltage charged to the capacitor is not lower than a timer voltage, and wherein the timer voltage is equal to a voltage that is charged to the capacitor by the predetermined current during the predetermined period.

* * * * *